(12) United States Patent
Noyes

(10) Patent No.: US 12,411,539 B2
(45) Date of Patent: Sep. 9, 2025

(54) CENTRALIZED VIRTUAL REALITY AND AUGMENTED REALITY ACTIVITY SYSTEM

(71) Applicant: Joshua Steven Noyes, Saint George, ME (US)

(72) Inventor: Joshua Steven Noyes, Saint George, ME (US)

(*) Notice: Subject to any disclaimer, the term of this patent is extended or adjusted under 35 U.S.C. 154(b) by 569 days.

(21) Appl. No.: 17/552,695

(22) Filed: Dec. 16, 2021

(65) Prior Publication Data

US 2023/0195208 A1    Jun. 22, 2023

(51) Int. Cl.
| | |
|---|---|
| *A63F 13/24* | (2014.01) |
| *A63B 71/04* | (2006.01) |
| *A63F 13/816* | (2014.01) |
| *G06F 3/01* | (2006.01) |
| *G09B 9/00* | (2006.01) |
| *H04L 67/131* | (2022.01) |
| *H04N 7/18* | (2006.01) |
| *A63B 71/06* | (2006.01) |
| *G06Q 10/10* | (2023.01) |

(52) U.S. Cl.
CPC .............. *G06F 3/011* (2013.01); *A63B 71/04* (2013.01); *A63F 13/24* (2014.09); *A63F 13/816* (2014.09); *G09B 9/00* (2013.01); *H04L 67/131* (2022.05); *H04N 7/18* (2013.01); *A63B 2071/0625* (2013.01); *A63F 2300/8082* (2013.01); *G06F 2203/012* (2013.01); *G06Q 10/10* (2013.01)

(58) Field of Classification Search
CPC . G06F 3/011; A63B 71/04; A63B 2071/0625; A63F 2300/8082; A63F 13/211; A63F 13/212; A63F 13/25; A63F 13/35; A63F 13/428; A63F 13/5255; A63F 13/843; A63F 13/90; A63F 13/24; A63F 13/816; G09B 9/00

See application file for complete search history.

(56) References Cited

U.S. PATENT DOCUMENTS

| | | | | | |
|---|---|---|---|---|---|
| 5,980,256 | A  | * | 11/1999 | Carmein ................. | G09B 9/165 |
| | | | | | 482/902 |
| 6,902,513 | B1 | * | 6/2005 | McClure ............ | A63B 24/0006 |
| | | | | | 482/4 |
| 10,591,286 | B2 | * | 3/2020 | Abovitz ................. | G16H 40/00 |
| 11,159,768 | B1 | * | 10/2021 | Liu ........................ | H04W 4/029 |
| 2010/0271394 | A1 | * | 10/2010 | Howard .................. | G06F 3/011 |
| | | | | | 345/633 |
| 2014/0082526 | A1 | * | 3/2014 | Park ....................... | H04L 65/403 |
| | | | | | 715/757 |
| 2015/0248791 | A1 | * | 9/2015 | Abovitz ............. | G02B 27/4227 |
| | | | | | 345/633 |
| 2017/0272838 | A1 | * | 9/2017 | Glazer ..................... | G06F 3/012 |
| 2019/0182355 | A1 | * | 6/2019 | Clement ............... | A63F 13/428 |
| 2020/0142475 | A1 | * | 5/2020 | Paez .................... | G06F 3/04845 |
| 2020/0289922 | A1 | * | 9/2020 | McCoy ................ | A63F 13/428 |

(Continued)

*Primary Examiner* — David L Lewis
*Assistant Examiner* — Shauna-Kay Hall

(57) ABSTRACT

The present disclosure provides a centralised virtual and augmented reality activity system comprising a plurality of co-located virtual reality suites, each fully equipped with virtual reality accessories and set in an environment that is safe and spacious. The user devices of each suite are managed by a central server, also in the same location, which allows for interactions both between users of the different suites and facilitates normal interaction between the user devices and the internet.

11 Claims, 2 Drawing Sheets

(56) References Cited

U.S. PATENT DOCUMENTS

2020/0335001 A1\* 10/2020 Freiwirth .............. A63F 13/211
2021/0366193 A1\* 11/2021 Goetgeluk ............. G06F 3/011
2022/0062763 A1\* 3/2022 Wong ...................... A63F 13/35
2022/0101593 A1\* 3/2022 Rockel .................... G06F 3/017

\* cited by examiner

CENTRALIZED VIRTUAL REALITY AND AUGMENTED REALITY ACTIVITY SYSTEM

FIELD OF INVENTION

The present invention relates generally to virtual and augmented reality, and more particularly, to a virtual reality and augmented reality enabled activity location.

BACKGROUND

Virtual reality (VR) refers to a computer-generated process that immerses the user into a virtual environment. Using a device such as a VR headset, virtual reality provides a user with the sensation of a simulated world or environment.

Virtual reality is performed by stimulating various human senses. A major aspect of virtual reality is stimulating the visual senses. VR headsets are designed to create an immersive 3D environment. VR headsets include the optics and electronics for rendering a display in front of eyes that displays a view of the virtual environment. Two autofocus lenses are generally placed between the screen and the eyes that adjust based on individual eye movement and positioning. The visual elements provided to the user on the screen are rendered by an electronic computing device such as a mobile phone or other connected computing device.

Another aspect of virtual reality is sound. Sound that is synchronized with the visual component can create very engaging effects. Headphone speakers, combined with audio processing to create directional sound effects, can help to provide an immersive experience. Another aspect of virtual reality is head tracking. VR headsets may include devices such as accelerometers to detect three-dimensional movement, gyroscopes for angular movement and/or a magnetic compass to identify the orientation of a user. As the user moves his/her head, the display and/or sounds presented to the user are updated in real time, making the user feel as if he/she is "looking around" in the virtual environment.

Virtual reality is finding new uses in areas such as business, gaming, entertainment, and education. As technology improves, new and exciting applications for virtual reality are enabled, however an enduring problem with virtual and augmented reality solutions is that they are limited in their scope and safety by the home environment of the user. Currently, users must make large investments in accessories such as 360 degree treadmills and sacrifice large amounts of space in their homes in order to truly experience the full capabilities of virtual reality solutions.

It is within this context that the present invention is provided.

SUMMARY

The present disclosure provides a centralised virtual and augmented reality activity system comprising a plurality of co-located virtual reality suites, each fully equipped with virtual reality accessories and set in an environment that is safe and spacious. The user devices of each suite are managed by a central server, also in the same location, which allows for interactions both between users of the different suites and facilitates normal interaction between the user devices and the internet.

Thus, according to one aspect of the present disclosure there is provided a centralized virtual and augmented reality activity system, the system comprising: a plurality of virtual reality suites, each suite comprising a room provided with a floor-mounted treadmill device, padded walls encompassing the treadmill device, a set of speakers, and one or more user devices each configured to access a virtual reality environment; and a central server in communication with each of the virtual reality suites, the central server being configured to co-ordinate interactions between users of each of the user devices and the virtual environment through operating the respective treadmill devices and speakers of each suite in accordance with and in response to a user's actions within the virtual environment.

The central server is further configured to co-ordinate interactions between users of the different virtual reality suites within the virtual environment, and to provide network connectivity to each of the virtual reality suites to facilitate interactions between users of the virtual reality suites and other virtual environments over the internet, The plurality of virtual reality suites and the central server are located together at a single location.

In some embodiments, the one or more user devices for accessing the virtual environment comprise a VR headset and controllers.

In some embodiments, the treadmill devices have 360 degree rotational capabilities to allow a user to walk in any direction within the virtual environment.

In some embodiments, each virtual reality suite is further equipped with one or more cameras, and the central server is further configured to allow monitoring of each suite via the one or more cameras.

In some embodiments, the central server is configured to control the speakers of each virtual reality suite to generate sounds for simulating a virtual reality environment and to convey instructions, alerts, notifications, and warnings to users of the user devices.

In some embodiments, the virtual reality suites are each specially adapted for different virtual and augmented reality needs.

In some cases, the virtual reality suites include specially adapted gaming suites in which the user devices including high spec gaming apparatus.

In some cases the virtual reality suites include specially adapted business suites which host a plurality of user devices capable of accessing a shared virtual reality environment in a room configured for virtual conferences.

In some cases the virtual reality suites include specially adapted fitness suites including exercise equipment for use in virtual fitness classes and games.

In some cases the virtual reality suites include specially adapted performance suites including audio and video recording equipment and in which the user devices are capable of accessing a performance virtual reality space accessible by followers over the internet.

In some cases the virtual reality suites include specially adapted educational suites comprising educational equipment.

BRIEF DESCRIPTION OF THE DRAWINGS

Various embodiments of the invention are disclosed in the following detailed description and accompanying drawings.

Figure 1:
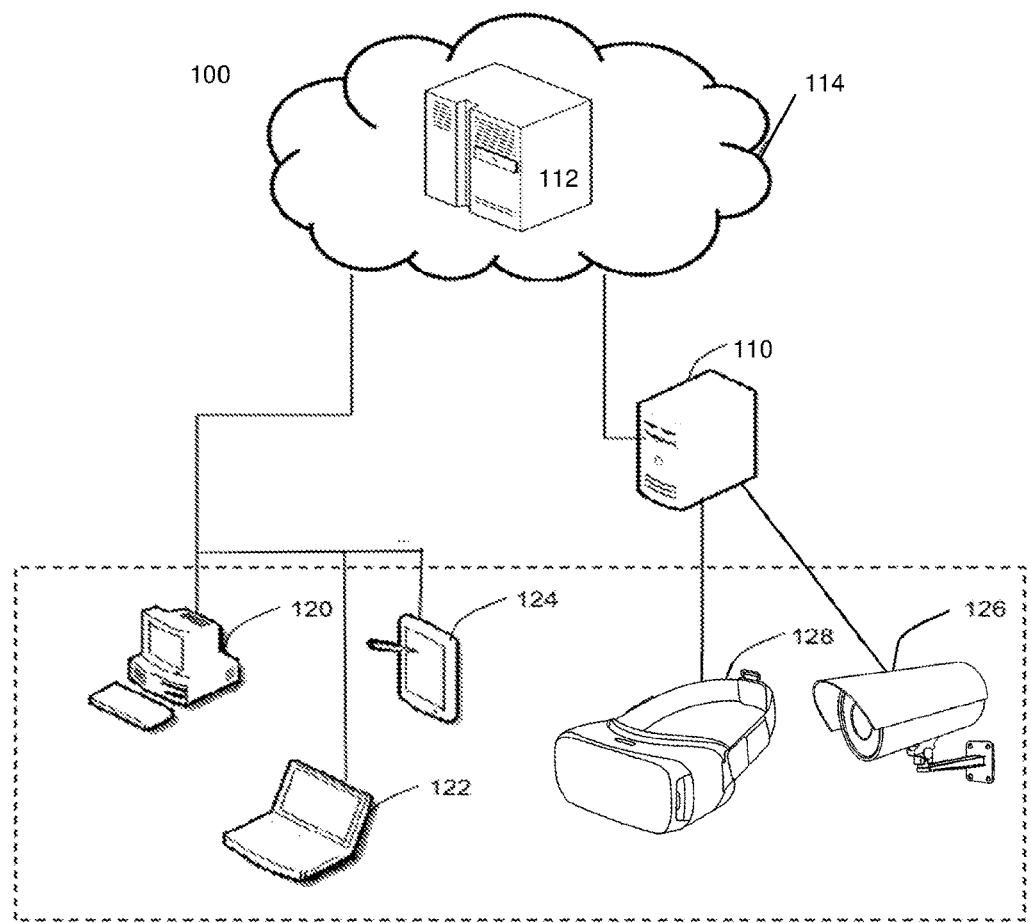
FIG. 1 illustrates an example system and network architecture over which the present invention may be implemented.

Common reference numerals are used throughout the figures and the detailed description to indicate like elements. The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present disclosure provides a central system of interconnected virtual reality suites where users may make full use of virtual reality equipment for various purposes and in a safe environment.

The system facilitates both interaction between users within the facility and with other user devices outside the central facility over a network such as the internet.

Referring to FIG. 1, there is shown an illustrative network architecture system that includes a server 112 or a cloud based service 114 with which the disclosed system may communicate and integrate with.

The illustrative server 112 or cloud service 114 is configured to communicate with a number of periphery user devices shown in the dashed box. The illustrative periphery devices include user devices which can be used to access and interact with a virtual environment such as a personal computer 120, a laptop 122, a tablet computer 124.

The periphery devices also include user devices at the central location from which the system operates, for example a plurality of sensors such as depth cameras 126 for capturing user actions and providing feedback, and a plurality of headset devices 128 for immersing users in a real world environment. Headset devices 128 that are remote from the central facility may also be included in the periphery devices.

The periphery devices of the system which are at the central location interact with the server 112 or cloud service 114 and with each other via a local server 110 which is referred to herein as a central server of the system. This central server 110 is usually co-located with the cameras and user devices of the system, controlling their interactions as well as various other environmental factors of the system such as speakers, treadmills, etc.

The user devices may be operationally coupled to a wide area network (WAN) such as the Internet with a wireless connection. The wireless clients may be communicatively coupled to the WAN via a Wi-Fi (or Bluetooth) access point that is communicatively coupled to a modem, which is communicatively coupled to the WAN. The wireless clients may also be communicatively coupled to the WAN using a proprietary carrier network that includes illustrative communication tower.

Figure 2:
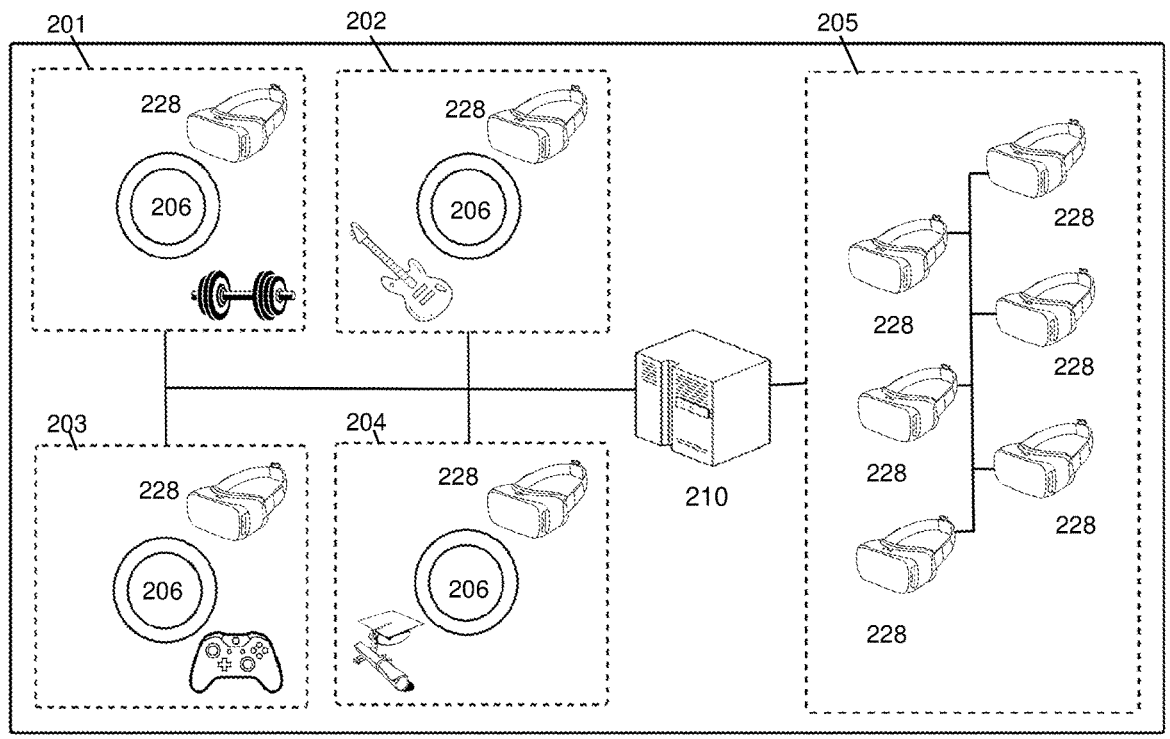
FIG. 2 illustrates an example structure of a centralised virtual reality and augmented reality activity system according to the present disclosure.

Referring to FIG. 2, an example functional structure of a centralised virtual reality and augmented reality activity system 200 according to the present disclosure is shown.

As can be seen, the system is comprised of a plurality of co-located virtual reality suites having different themes and equipment for accessing a virtual reality environment, within a central facility 200. In the present example one suite of each type is shown for illustrative clarity, but in practice many suites of each type may be included.

The suites include an exercise or fitness suite 201, a performance suite 202, a gaming suite 203, an educational suite 204, and a business suite 205. Each suite is equipped with at least one user device 228 for accessing a virtual environment.

The user devices of each suite are coupled with and managed by central server 210 which is configured to coordinate the treadmills, cameras, speakers, and other equipment within each suite with the actions of the user within the virtual environment and to also coordinate interactions between users within the different suites, and to manage a connection between the user devices 228 and external periphery devices over a cloud or server architecture as described with reference to FIG. 1.

Each suite is equipped to provide a safe environment fully furnished with all the tools and technology needed to experience the metaverse and various VR and AR interactions. For example, each suite includes not only a virtual reality user device 228 such as a headset, but also includes built in treadmill-like sections of floor 206 with 360 degree rotational capability for the experience of walking in each room. Walls will be padded, with sound dampening material. Each suite will also include audio and speakers and may include one or more depth cameras for sensing a user's movements within the suites.

Furthermore, each suite is equipped to accommodate the specialised needs of users who are accessing virtual reality for different purposes.

Fitness Suites 201—these suites will cater to those who need specific equipment to interact with a virtual fitness instructor or to play virtual fitness games.

Performance Suites 202—these suites will allow any performer, such as a musician, actor, comedian, etc to perform and broadcast to an audience. For example, the suite may include audio and video recording equipment and user devices that are capable of accessing a performance virtual reality space accessible by followers over the internet.

Conversely, their audience could gather at a suite and interact with the performer in a "fest" like manner.

Education Suites 203—these suites will focus on all aspects of education/teaching. This may include education at every level from K-12 to university and even "How To" classes for learning specialized skills.

Gaming Suites 204—these suites will cater to those who want a truly immersive gaming experience in the metaverse and may for example include high spec gaming apparatus.

Business suites 205—these suites will be setup for those in need of business meeting or celebratory needs and may be provided in an extra large space with a high number of interconnected headset apparatus 228 for accessing a shared virtual reality environment—since it is often the case that some businesses will need a larger space than what their current office space can provide, or for example need to have a large meeting with another office overseas.

Figure 3:
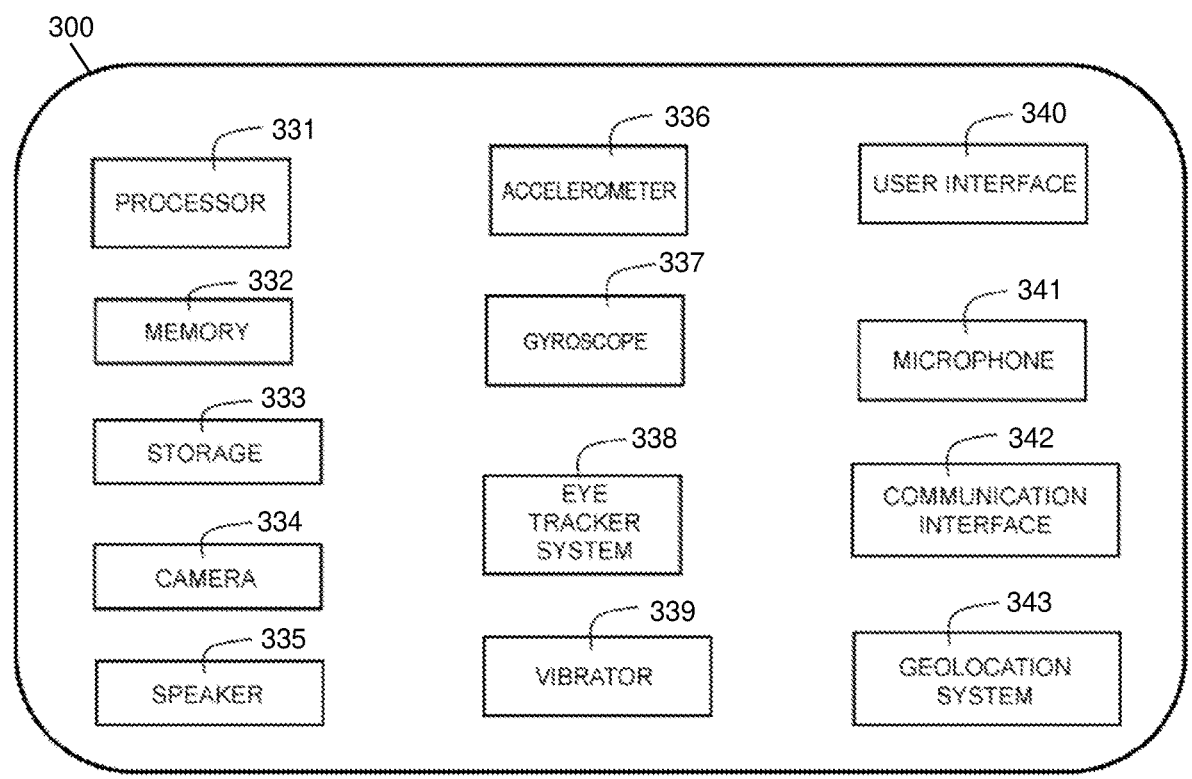
FIG. 3 illustrates a block component diagram of a user device configured for accessing virtual reality in accordance with the system of the present disclosure.

Referring to FIG. 3, a block component diagram of a user device headset 300 configured for accessing a virtual reality environment as shown in FIGS. 2 and 3 is shown.

In this example configuration, the device 300 includes a processor 331, which is coupled to a memory 332. Memory 332 may include dynamic random-access memory (DRAM), static random-access memory (SRAM), magnetic storage, and/or a read only memory such as flash, EEPROM, optical storage, or other suitable memory. In some embodiments, the memory 332 may not be a transitory signal per se.

Device 300 may further include storage 333. In embodiments, storage 333 may include one or more magnetic storage devices such as hard disk drives (HDDs). Storage 333 may additionally include one or more solid state drives (SSDs).

Device 300 may, in some embodiments, include a user interface 340. This may include a display, keyboard, or other suitable interface. In some embodiments, the display may be touch-sensitive.

The device 300 further includes a communication interface 342. The communication interface 342 may include a wireless communication interface that includes modulators, demodulators, and antennas for a variety of wireless protocols including, but not limited to, Bluetooth™, Wi-Fi, and/or cellular communication protocols for communication over a computer network and/or operation with an indoor positioning system (IPS). In embodiments, instructions are stored in memory 332. The instructions, when executed by the processor 331, cause the electronic computing device 300 to execute operations in accordance with disclosed embodiments.

Device 300 may further include a microphone 341 used to receive audio input. The audio input may include speech utterances. The audio input may be digitized by circuitry within the device 300. The digitized audio data may be analysed for phonemes and converted to text for further natural language processing. In some embodiments, the natural language processing may be performed onboard the device 300. In other embodiments, all or some of the natural language processing may be performed on a remote computer.

Device 300 may further include camera 334. In embodiments, camera 334 may be used to acquire still images and/or video images by device 300. Device 300 may further include one or more speakers 335. In embodiments, speakers 335 may include stereo headphone speakers, and/or other speakers arranged to provide an immersive sound experience. Device 300 may further include geolocation system 343. In embodiments, geolocation system 343 includes a Global Positioning System (GPS), GLONASS, Galileo, or other suitable satellite navigation system.

Device 300 may further include an accelerometer 336 and/or gyroscope 337. The accelerometer 336 and/or gyroscope 337 may be configured and disposed to track movements of a user, such as head and/or hand movements while donning wearable computing devices such as virtual reality headsets and/or handheld remote-control devices in communication with a virtual reality system.

Device 300 may further include an eye tracker system 338. The eye tracker system 338 may include one or more cameras 334 configured and disposed to track eye movement of a user, and render portions of a virtual environment based on eye movement. Device 300 may further include a vibrator 339 which may be used to provide tactile alerts. These components are exemplary, and other devices may include more, fewer, and/or different components than those depicted in FIG. 3.

Some of the functional components described in this specification have been labelled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the system have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A centralized virtual and augmented reality activity system, the system comprising:
    a plurality of virtual reality suites, each suite indicating a specific theme and comprising a room provided with a floor-mounted treadmill device, padded walls encompassing the treadmill device, a set of speakers, and one or more user devices each configured to access a virtual reality environment of the specific theme,
    wherein the treadmill device allow a user to walk within the virtual reality environment; and
    a central server in communication with each of the virtual reality suites, the central server being configured to co-ordinate interactions between users of each of the user devices and the virtual environment through operating the respective treadmill devices and speakers of each suite in accordance with and in response to a user's actions within the virtual environment;
    the central server being further configured to co-ordinate interactions between users of the different virtual reality suites within the virtual environment, and to provide network connectivity to each of the virtual reality suites to facilitate interactions between users of the virtual reality suites and other virtual environments over the internet;
    wherein the plurality of virtual reality suites and the central server are located together at a single location.

2. The centralized virtual and augmented reality activity system according to claim 1, wherein the one or more user devices for accessing the virtual environment comprise a VR headset and controllers.

3. The centralized virtual and augmented reality activity system according to claim 1, wherein the treadmill devices have 360 degree rotational capabilities to allow a user to walk in any direction within the virtual environment.

4. The centralized virtual and augmented reality activity system according to claim 1, wherein the central server is configured to control the speakers of each virtual reality suite to generate sounds for simulating a virtual reality environment and to convey instructions, alerts, notifications, and warnings to users of the user devices.

5. The centralized virtual and augmented reality activity system according to claim 1, wherein the virtual reality suites are each specially adapted for different virtual and augmented reality needs.

6. The centralized virtual and augmented reality activity system according to claim 5, wherein the virtual reality suites include specially adapted gaming suites in which the user devices including high spec gaming apparatus.

7. The centralized virtual and augmented reality activity system according to claim 5, wherein the virtual reality suites include specially adapted business suites which host a plurality of user devices capable of accessing a shared virtual reality environment in a room configured for virtual conferences.

8. The centralized virtual and augmented reality activity system according to claim 5, wherein the virtual reality suites include specially adapted fitness suites including exercise equipment for use in virtual fitness classes and games.

9. The centralized virtual and augmented reality activity system according to claim 5, wherein the virtual reality suites include specially adapted performance suites including audio and video recording equipment and in which the user devices are capable of accessing a performance virtual reality space accessible by followers over the internet.

10. The centralized virtual and augmented reality activity system according to claim 5, wherein the virtual reality suites include specially adapted educational suites comprising educational equipment.

11. The centralized virtual and augmented reality activity system according to claim 1, wherein each virtual reality suite is further equipped with one or more cameras, and the central server is further configured to allow monitoring of each suite via the one or more cameras.

* * * * *